Figure 1:
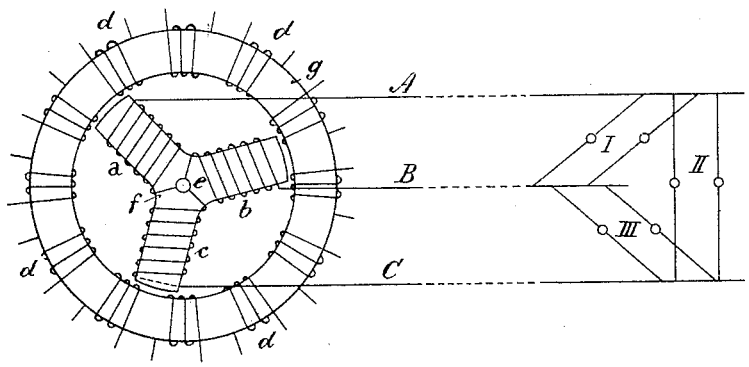

(No Model.) 5 Sheets—Sheet 1.
M. VON DOLIVO-DOBROWOLSKY.
TRANSMISSION OF ALTERNATING CURRENTS OF DIFFERENT PHASE.
No. 455,683. Patented July 7, 1891.

(No Model.) 5 Sheets—Sheet 2.

M. VON DOLIVO-DOBROWOLSKY.
TRANSMISSION OF ALTERNATING CURRENTS OF DIFFERENT PHASE.

No. 455,683. Patented July 7, 1891.

Witnesses:

Inventor

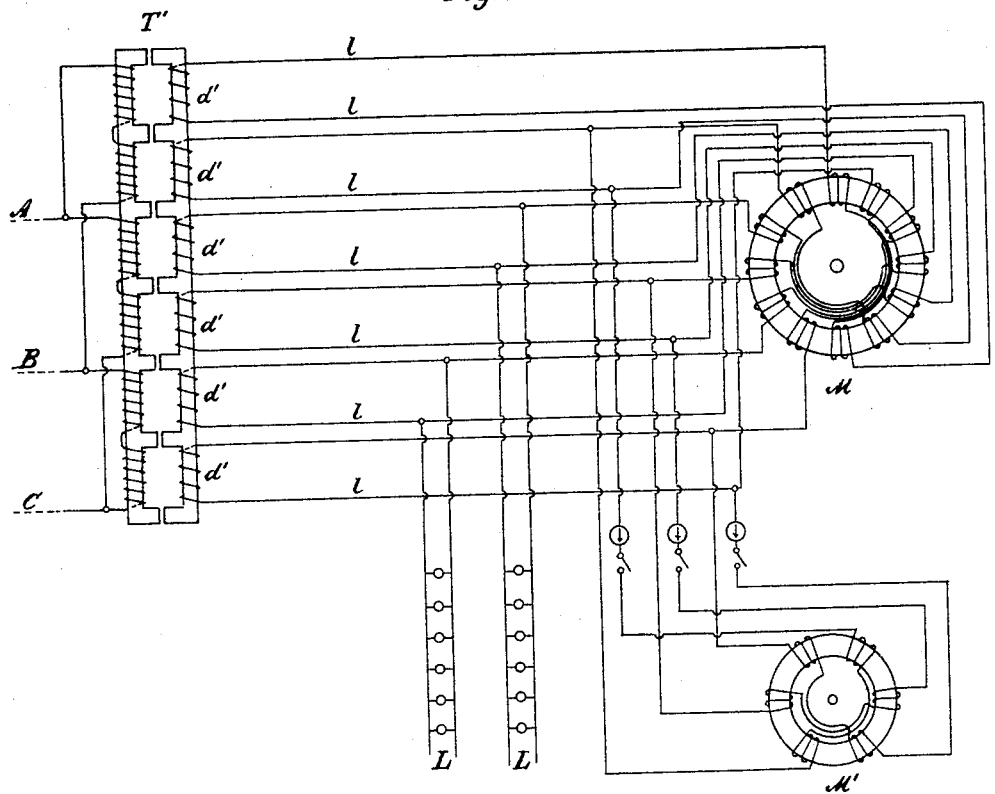

(No Model.) 5 Sheets—Sheet 5.

M. VON DOLIVO-DOBROWOLSKY.
TRANSMISSION OF ALTERNATING CURRENTS OF DIFFERENT PHASE.

No. 455,683. Patented July 7, 1891.

Witnesses:

Inventor:
M. von Dolivo-Dobrowolsky

United States Patent Office.

MICHAEL VON DOLIVO-DOBROWOLSKY, OF BERLIN, GERMANY, ASSIGNOR TO THE ALLGEMEINE ELEKTRICITÄTS-GESELLSCHAFT, OF SAME PLACE.

TRANSMISSION OF ALTERNATING CURRENTS OF DIFFERENT PHASE.

SPECIFICATION forming part of Letters Patent No. 455,683, dated July 7, 1891.

Application filed March 28, 1891. Serial No. 386,823. (No model.)

*To all whom it may concern:*

Be it known that I, MICHAEL VON DOLIVO-DOBROWOLSKY, a subject of the Emperor of Russia, residing at Berlin, Kingdom of Prussia, have invented a new and useful Improvement in the Transmission of Alternating Differential-Phase Currents, whereof the following is a specification.

My invention relates to the transmission of alternating currents whose respective phases succeed each other, or differential-phase currents, to distant points of consumption; and its object is to utilize the advantages presented by causing a large number of alternating currents of the said kind to be produced by the generators and to act in the motors, &c., without being obliged to employ an excessive number of transmitting-mains. For this purpose the primary currents supplied in plurality by the generator are first converted by means of transformers into a reduced number of secondary alternating differential-phase currents, (preferably into three, differing in their phases by one hundred and twenty degrees or one-third of a phasial length.) These secondary currents are thereupon conducted by a corresponding number of mains to the distant points and there split again by other transformers into a greater number of tertiary differential-phase currents, which are then caused to operate in the motors, lamps, or other current-consuming apparatuses. The means for converting many primary currents into a small number of main currents and those serving for the conversion of main currents into a larger number of operating-currents may be employed independently of each other. The mains may be arranged in circuit with the coils of the transformers in ordinary manner or by means of the system of connections in which each main forms a circuit with one of the other mains and one or more of the transformer-coils, and which I shall call "concatenated circuits," the said system requiring but as many mains as there are currents to be transmitted; but in this system a common return-wire may be introduced.

In view of equalizing the tension of the primary currents supplied by the generator, I combine regulating apparatuses and voltmeters with the connections between the generator and the transformer.

Figure 2:
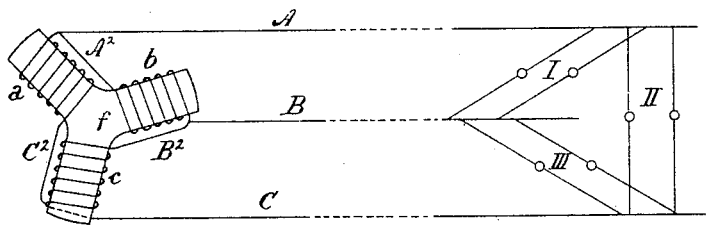
Figure 3:
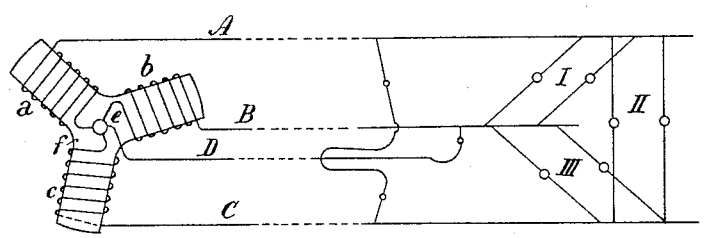
Figure 4:
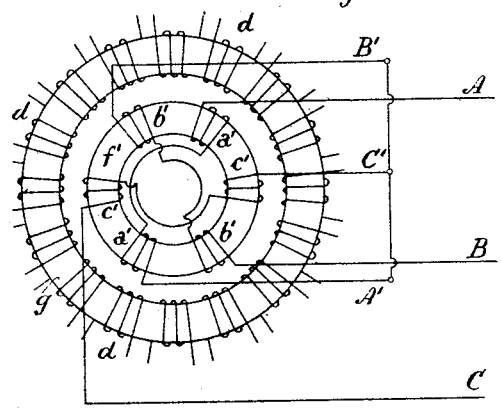
Figure 5:
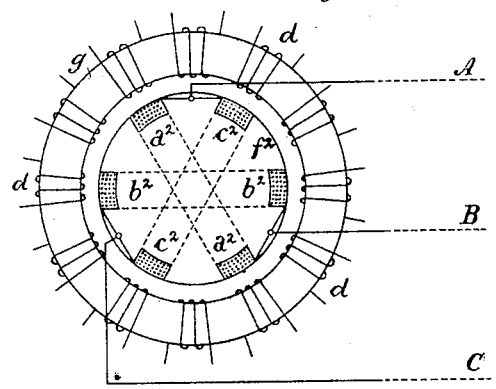
Figure 8:
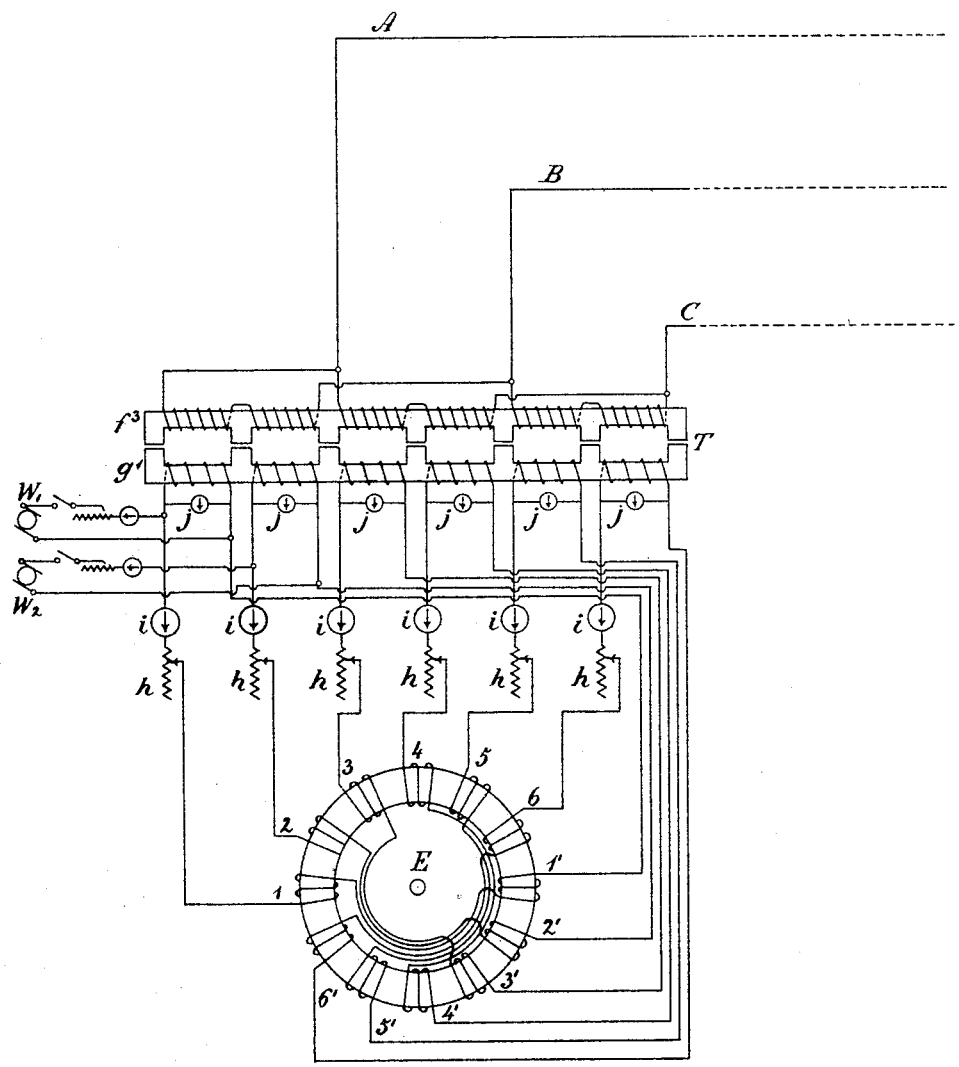
Figure 11:
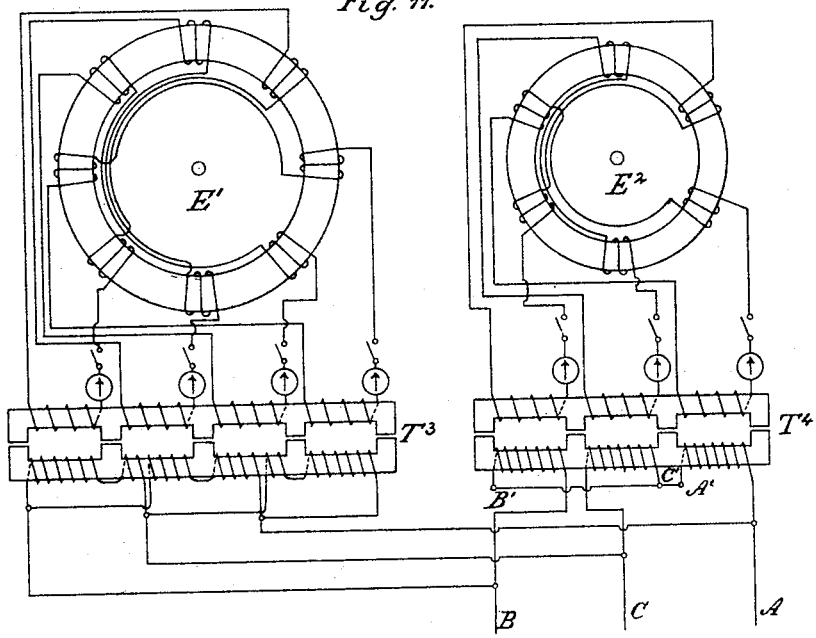
Figure 10:
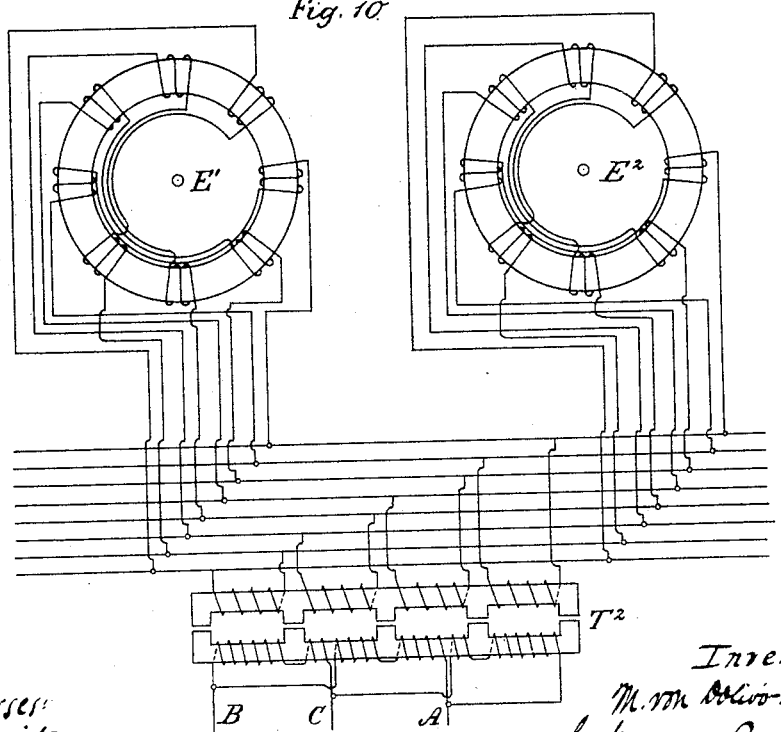

In the annexed drawings, Figure 1 is a diagrammatic view of a circular transformer and conductive mains constructed and combined according to my invention. Figs. 2 and 3 represent the inner part of the same transformer with different connections between the coils thereof and the mains. Figs. 4 to 7 are views of other transformers and their connections to the mains. Fig. 8 shows a dynamo producing a plurality of currents, in combination with a transformer for reducing the number thereof to three. Fig. 9 represents a transformer for converting three currents into a greater number, in combination with motors and lamps. Figs. 10 and 11 show two dynamos combined in different manners with transformers and three mains.

The transformer illustrated by Fig. 1 consists in the iron ring $g$, carrying a plurality of primary or exciting coils $d$, and the iron star $f$, having three arms provided with the secondary or excited coils $a\ b\ c$, the latter being all connected together at their inner ends $e$, while their outer ends are individually connected to the mains A B C. For completing the line-circuits the mains A B A C B C are shown connected together at their outer ends by the respective systems of lamps I II III, three concatenated circuits being thus produced, which require three mains only. Whenever the coils $d$ are supplied with alternating currents in such manner that the phases of these currents follow one after the other in the successive coils, a circumrotating magnetic field is obtained, which induces in the secondary coils $a\ b\ c$ three currents of a phasial difference of one hundred and twenty degrees.

In the modified arrangement shown by Fig. 2, the outer end of the coil $a$ is connected to the main A and by the wire $A^2$ to the inner end of coil $b$, while the coils $b\ c$ are connected in like manner to the respective mains B C, and by the wires $B^2\ C^2$ to the respective coils $c\ a$, a system of three concatenated circuits being thus also produced with but three mains. These systems of concatenated circuits do not, however, in themselves form any part of my present invention.

Figure 6:
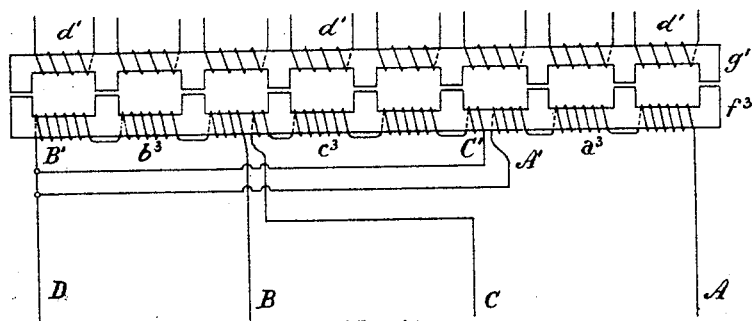
Figure 7:
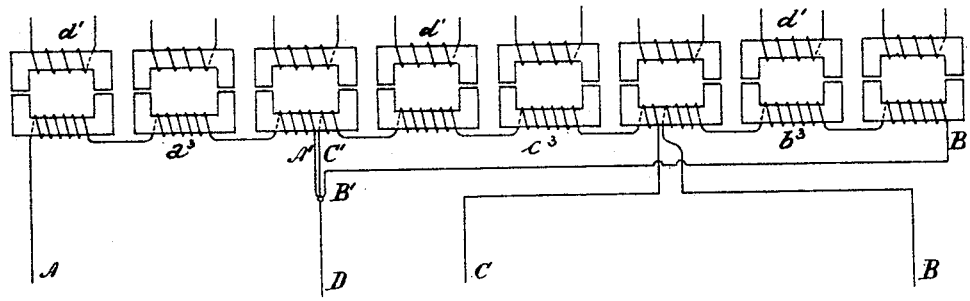

Fig. 3 represents an arrangement of circuits which is derived from the one described first by the addition of a common return-wire D, connected at $e$ to the three coils $a\,b\,c$ and split at its distant end into three branches severally attached to the mains A B C. On account of the currents nearly neutralizing each other in the said wire D, the same may be made of much smaller section than the other mains. This is the kind of circuit which I employ by preference with my system of current transmission. My invention is, however, entirely independent of the form of transformer employed, and for this reason I have shown in Figs. 4 to 7 four different constructions of transformers provided with coils or sets of coils so arranged and connected as to be serviceable for the purpose of the invention. Thus according to Fig. 4 three pairs $a'\,b'\,c'$ of induction-coils are placed on an annular core $f'$ and connected to the mains A B C, and with each other by the wires A' B' C'. According to Fig. 5 three coils $a^2\,b^2\,c^2$ are wound on a disk-shaped or cylindrical core $f^2$, and connected pairwise to the mains A B C. Fig. 6 represents a transformer composed of the straight core $g'$ with primary coils $d'$, and the like core $f^3$ with three sets of coils $a^3\,b^3\,c^3$, the coils of each set being only separated from each other by the polar extensions of the core, but forming virtually a single coil. The three sets of coils are connected at one end to the respective mains A B C, and at the other end by the wires A' B' C' to each other and to the wire D. The arrangement illustrated by Fig. 7 consists in a plurality of transformers combined to constitute a single system, the secondary coils being again connected to form virtually three coils which are connected to the mains A B C and the wire D, substantially in the same manner as in the foregoing case.

It will be perceived that by all these arrangements a plurality of primary currents are converted into three secondary currents circulating in concatenated circuits, so that they may be conducted to distant points by a small number of mains. For the effect to be obtained it is, however, not only indifferent what arrangement of transformers is employed, but it is also immaterial whether in the conversion of the currents the tension of the latter is altered—that is to say, whether the secondary coils are arranged to produce currents whose tension is equal to that of the primary currents or higher. By means alike to those employed for the conversion of a plurality of currents into three (or any other limited number) it is also possible to convert the latter again at the point of consumption into a plurality of tertiary currents, it being for this purpose only necessary to connect to the mains A B C or to these mains and wire D the coils $a\,b\,c$, $a'\,b'\,c'$, or $a^2\,b^2\,c^2$, &c., of another transformer having its core $g$ or $g'$ provided with a plurality of coils $d$ or $d'$. The number of tertiary currents thus produced may of course be different from that of the primary currents.

In Fig. 8 is shown a transformer T of the kind represented by Fig. 6 in combination with a multiple-current dynamo E, regulating apparatuses $h$, current-indicators $i$, and voltmeters $j$. The coils of the dynamo are connected to the primary coils on core $g'$ of the transformer by the wires 1 to 6 and the return wires 1' to 6', while the secondary coils on core $f^3$ are connected to the mains A B C, substantially in the manner described relatively to Fig. 2. By means of the regulators $h$ inserted into the wires 1 to 6, and the voltmeters $j$, the primary currents flowing through the said wires are regulated to have equal or nearly equal tension. The return-wires 1' to 6' may, however, be united in one wire of suitable section without prejudice to the independence of the individual currents and to the interruption, measuring, and regulation of each one singly.

Fig. 9 represents a distributing system comprising the transformer T' connected to the mains A B C, moreover two electromotors M M' of different sizes, and two systems of lamps L, the transformer T' being adapted to convert the three currents flowing through the mains into six currents. The motor M has six sets of exciting-coils, which are severally connected to all six coils $d'$ of the transformer T' by means of twelve wires $l$. A portion of the currents circulating in three of the coils $d'$ is in addition utilized for driving the motor M', having three sets of exciting-coils, the latter being connected to six of the aforesaid twelve wires $l$. Besides this, from four of the wires $l$ not connected with motor M are branched off two circuits supplying current to the lamps L.

In case one or some of the circuits of the generator should be overcharged by an excessive consumption of current unequally divided among the different portions of the electric distributing system, the tension of the currents in the said generator-circuits may be maintained at the proper height by means of ordinary alternating-current dynamos connected to the overcharged coils of the generator. Thus in Fig. 8 are indicated the brushes W' W² of two such dynamos connected to the circuits to which belong the wires 1 and 2.

If the current consumed is throughout greater than the amount that can be furnished by one dynamo, two or more such machines may be connected together in parallel in two different manners. Thus Fig. 10 shows an arrangement in which the corresponding currents of two machines E' E² unite previous to their passing into the single transformer T², while, according to Fig. 11, the parallel connection is established subsequent to the transformation of the currents by the two transformers T³ T⁴. The latter arrangement is generally preferable, because it does not require the machines to be constructed for equal numbers of phases. The machines E' E² (represented in Fig. 11) have, for instance, four and three sets of coils, respectively.

I claim as my invention—

1. The combination of a dynamo-electric machine having a plurality of coils or sets of coils in which independent alternating currents of relatively differing phases are induced, a transformer provided with as many primary coils as there are induction-coils or sets of coils in the dynamo, and with a smaller number of secondary coils, separate connections between the induction-coils of the dynamo and the primary transformer-coils, and mains connected to the secondary coils of the transformer, substantially as described.

2. The combination of a dynamo-electric machine having a plurality of coils or sets of coils in which independent alternating currents of relatively differing phases are induced, a transformer provided with as many primary coils as there are induction-coils or sets of coils in the dynamo and with a smaller number of secondary coils, separate connections between the induction-coils of the dynamo and the primary transformer-coils, and mains connected to the secondary coils of the transformer, the said mains forming together and with the said secondary coils concatenated circuits, substantially as specified.

3. The combination of a number of electric mains, a source of electricity connected to one end of the said mains and producing therein alternating currents of relatively differing phases, a transformer having primary coils connected to the other end of the mains, and secondary coils exceeding in number that of the former, and circuits connected to the secondary coils, substantially as set forth.

4. The combination of a number of electric mains, a source of electricity connected to one end of the mains and producing therein alternating currents of relatively differing phases, a transformer having primary coils connected to the other end of the mains and secondary coils exceeding in number that of the former, and circuits connected to the secondary coils, the said mains forming together and with the primary transformer-coils concatenated circuits, substantially as set forth.

5. The combination of a dynamo-electric machine having a plurality of coils or sets of coils in which independent alternating currents of relatively differing phases are induced, a transformer provided with as many primary coils as there are induction-coils or sets of coils in the dynamo and with a smaller number of secondary coils, separate connections between the induction-coils of the dynamo and the primary transformer-coils, regulating apparatuses and voltmeters combined with the said connections, and mains connected to the secondary coils of transformer, substantially as described.

6. The combination of an electric transformer having a plurality of primary coils and a lower number of secondary coils, another electric transformer having a number of primary coils equal to that of the secondary coils of the first transformer and a greater number of secondary coils, two systems of circuits connected, respectively, to the primary coils of the first and the secondary coils of the second transformer, and electric connections between the secondary coils of the first and the primary coils of the second transformer, substantially as described.

In testimony whereof I have hereunto set my hand in the presence of two subscribing witnesses.

MICHAEL VON DOLIVO-DOBROWOLSKY.

Witnesses:
FRITZ DELLMAR,
SIMON ROOS.